United States Patent [19]
Furuichi

[11] Patent Number: 4,579,327
[45] Date of Patent: Apr. 1, 1986

[54] SHEET HANDLING DEVICE
[75] Inventor: Katsushi Furuichi, Yokohama, Japan
[73] Assignee: Canon Kabushiki Kaisha, Tokyo, Japan
[21] Appl. No.: 476,157
[22] Filed: Mar. 17, 1983
[30] Foreign Application Priority Data
  Mar. 26, 1982 [JP] Japan .................. 57-49719
  Jun. 3, 1982 [JP] Japan .................. 57-95158
[51] Int. Cl.⁴ .............................. B65H 5/02
[52] U.S. Cl. ................... 271/3.1; 271/186; 271/225; 271/270; 271/902; 271/202
[58] Field of Search ............. 271/DIG. 9, 202, 270, 271/225, 182–186, 3.1

[56] References Cited
U.S. PATENT DOCUMENTS

| | | |
|---|---|---|
| 3,339,705 | 9/1967 | Burkhardt ............ 271/DIG. 9 X |
| 3,556,512 | 1/1971 | Feckler . |
| 3,942,785 | 3/1976 | Stange ............ 271/DIG. 9 X |
| 4,169,674 | 10/1979 | Russel . |
| 4,192,607 | 3/1980 | Hage . |
| 4,234,180 | 11/1980 | Looney . |
| 4,238,126 | 12/1980 | Langdon . |
| 4,411,517 | 10/1983 | Gerken . |
| 4,412,740 | 11/1983 | Buddendeck ............ 271/3.1 X |
| 4,433,836 | 2/1984 | Kulpa et al. . |

Primary Examiner—Richard A. Schacher
Attorney, Agent, or Firm—Fitzpatrick, Cella, Harper & Scinto

[57] ABSTRACT

A high-speed compact sheet handling device is disclosed. In this device sheet members are supplied from a stacking table to a required position and are ejected at a higher speed from that position to the stacking table, and the functions of supply and ejection can be effected at the same time.

17 Claims, 23 Drawing Figures

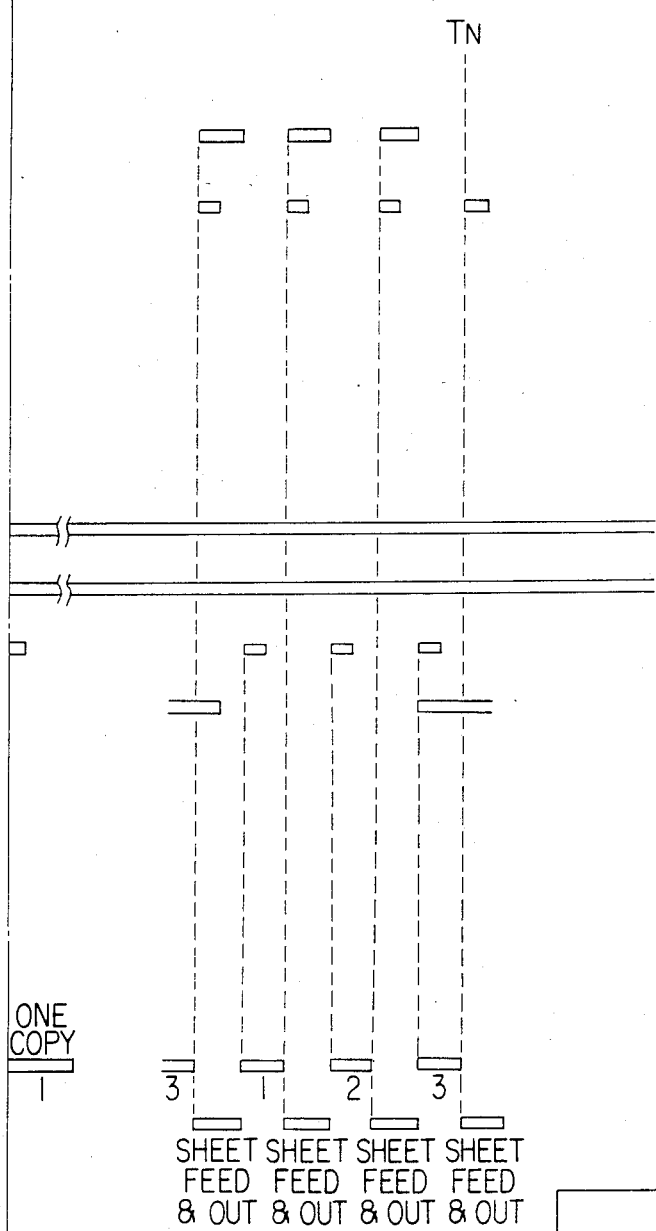

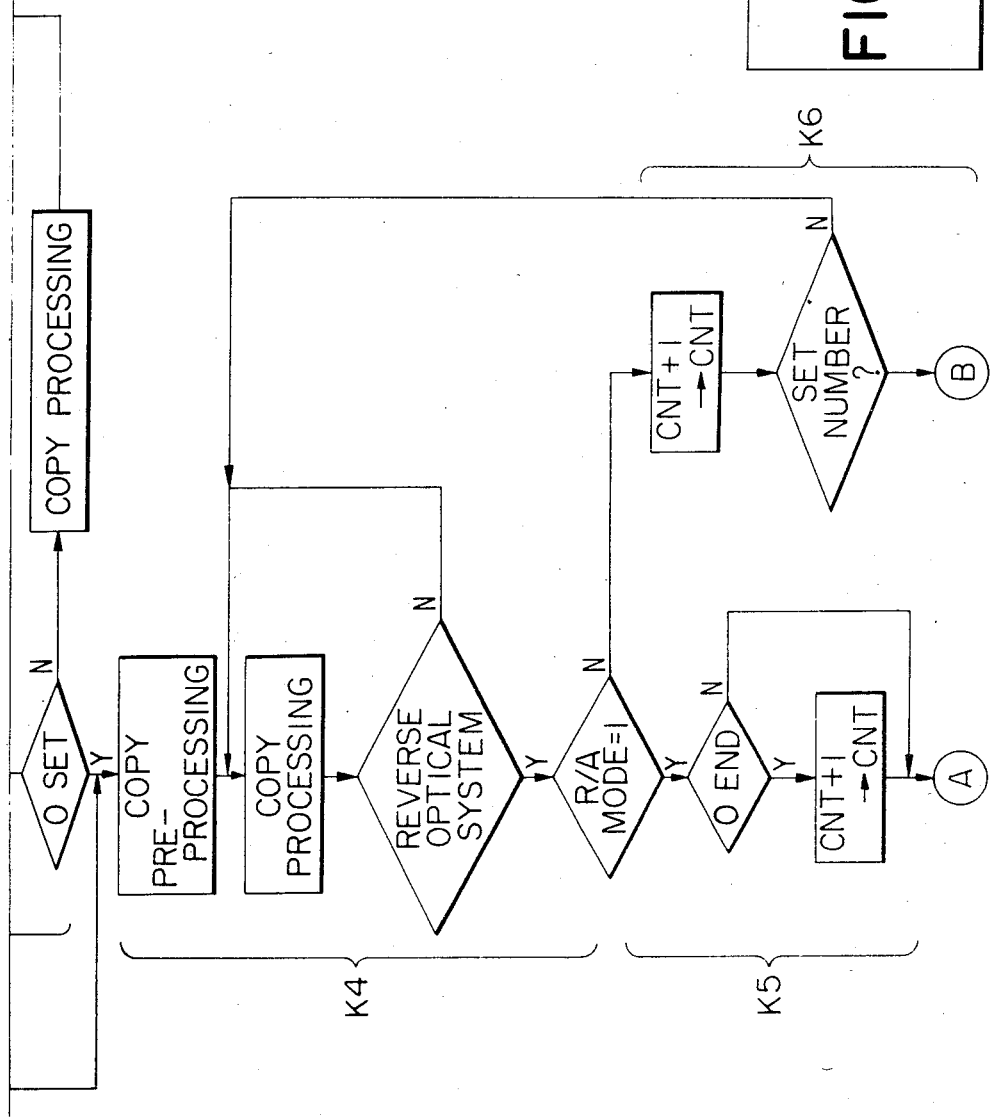

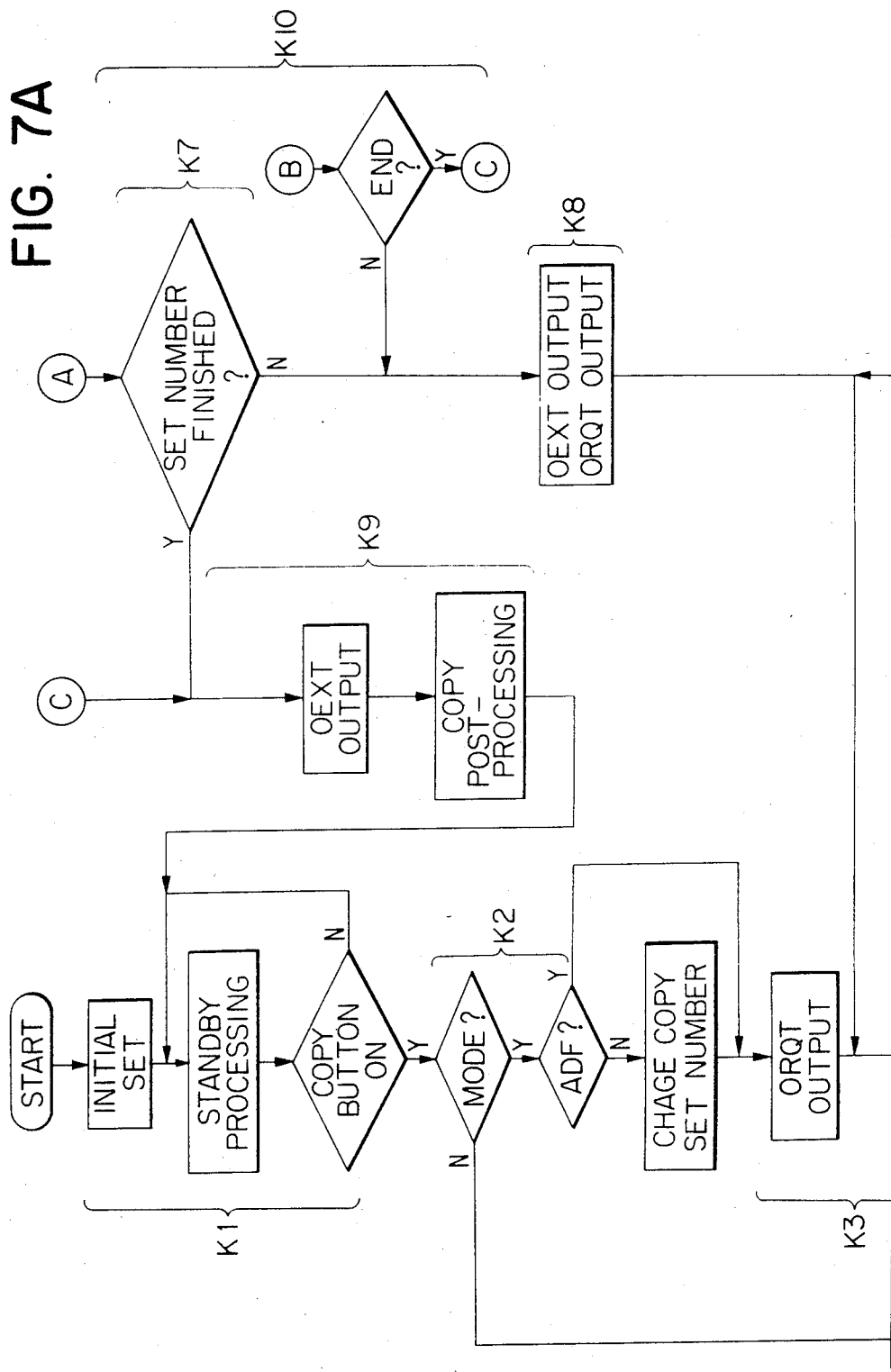

SHEET HANDLING DEVICE

BACKGROUND OF THE INVENTION

Field of the Invention

The present invention relates to a sheet handling device, and more particularly to such a device for supplying sheet documents to a determined position and thereafter ejecting said sheet documents from said determined position for example in a copier or the like.

Conventionally such a device has been utilized in an image processing apparatus such as a copier or facsimile device for achieving high-speed and efficient image processing.

As an example, an automatic sheet feeder employed in copiers is designed to feed sheet originals stacked on a table to a determined exposure position and then to advance the sheet originals after exposure in the same direction to an exit tray positioned opposite to said stacking table, or to feed the sheet originals from the stacking table to the exposure position and then back to the stacking table along a transport path of substantially closed loop shape.

However, such a device for ejecting the sheets to an exit tray is associated with the drawbacks that the ejected sheets are stacked in the inverted order and that the sheets have to be manually transferred from the tray to the stacking table in case said sheets are to be fed again.

Also, in a device with a closed loop transport path, the leading ends of the returning sheets may not be aligned at the exit of the stacking table in the case that said sheets are of different sizes, since said sheets return to the stacking table from a direction opposite to said exit. Also the closed loop structure requires that the driving units of the transport system be distributed over the entire apparatus. Furthermore there is required a considerable time from the ejection of a sheet original from the exposure position to the setting of a succeeding sheet original on said exposure position.

In case of producing plural copies from each of plural sheet originals with such an automatic sheet feeder, it has been necessary to continuously effect the copying operations corresponding to the desired number of copies for each transported sheet original, and to sort out the obtained copy sheets after the completion of continuous copying operations for all the sheet originals.

Also certain automatic sheet feeders of closed loop structure are capable of feeding the sheets once returned to the stacking table again to the exposure position. However, the sheet originals returning to the stacking table after exposure operation are simply superposed on the sheet originals remaining on the stacking table and often become undistinguishable from the latter or the number of repeated feedings may become uncertain.

SUMMARY OF THE INVENTION

In consideration of the foregoing, an object of the present invention is to provide a novel device for handling sheet members not associated with the aforementioned drawbacks.

Another object of the present invention is to provide a sheet handling device capable of high-speed sheet handling.

Still another object of the present invention is to provide a compact sheet handling device.

Still another object of the present invention is to provide a sheet handling device capable of continuous sheet handling without waste in time.

Still another object of the present invention is to provide a sheet handling device capable of handling plural sheet members.

Still another object of the present invention is to provide a sheet handling device allowing recycled handling of the same sheet.

The foregoing and still other objects of the present invention will become fully apparent from the following description.

BRIEF DESCRIPTION OF THE DRAWINGS

FIG. 7, composed of FIGS. 7A and 7B, is a flow chart showing the sequence control program for the copier and the automatic sheet original feeder;

DETAILED DESCRIPTION OF THE PREFERRED EMBODIMENTS

Now the present invention will be explained in detail with reference to an embodiment thereof applied to a copier. It is to be understood, however, that the automatic sheet original feeder of the present invention is applicable not only to the copier but also to similar apparatus such as facsimile.

Figure 1:
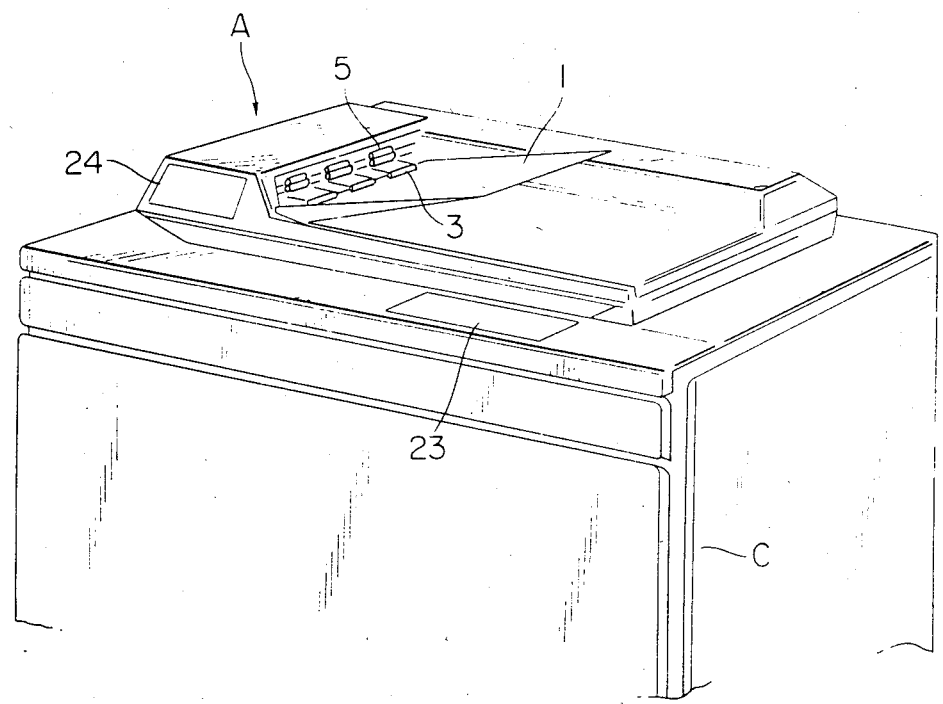
FIG. 1 is an external perspective view of an automatic sheet original feeder embodying the present invention and applied to a copier.

FIG. 1 is an external perspective view of the automatic sheet original feeder embodying the present invention and applied to a copier, in which the copier C is provided, on an exposure platen thereof, with an automatic sheet original feeder A. A feeding tray 1 is capable of supporting a sheet original or stacked plural sheet originals and is inclined in such a manner that the exit of sheet originals is positioned lower. A feeding belt 3 and a separating belt 5 are provided for separating and feeding the lowermost one of plural sheet originals stacked on the feeding tray 1. Also there are provided control panels 23, 24 for entering instructions respectively to the copier and to the automatic sheet original feeder.

Figure 2:
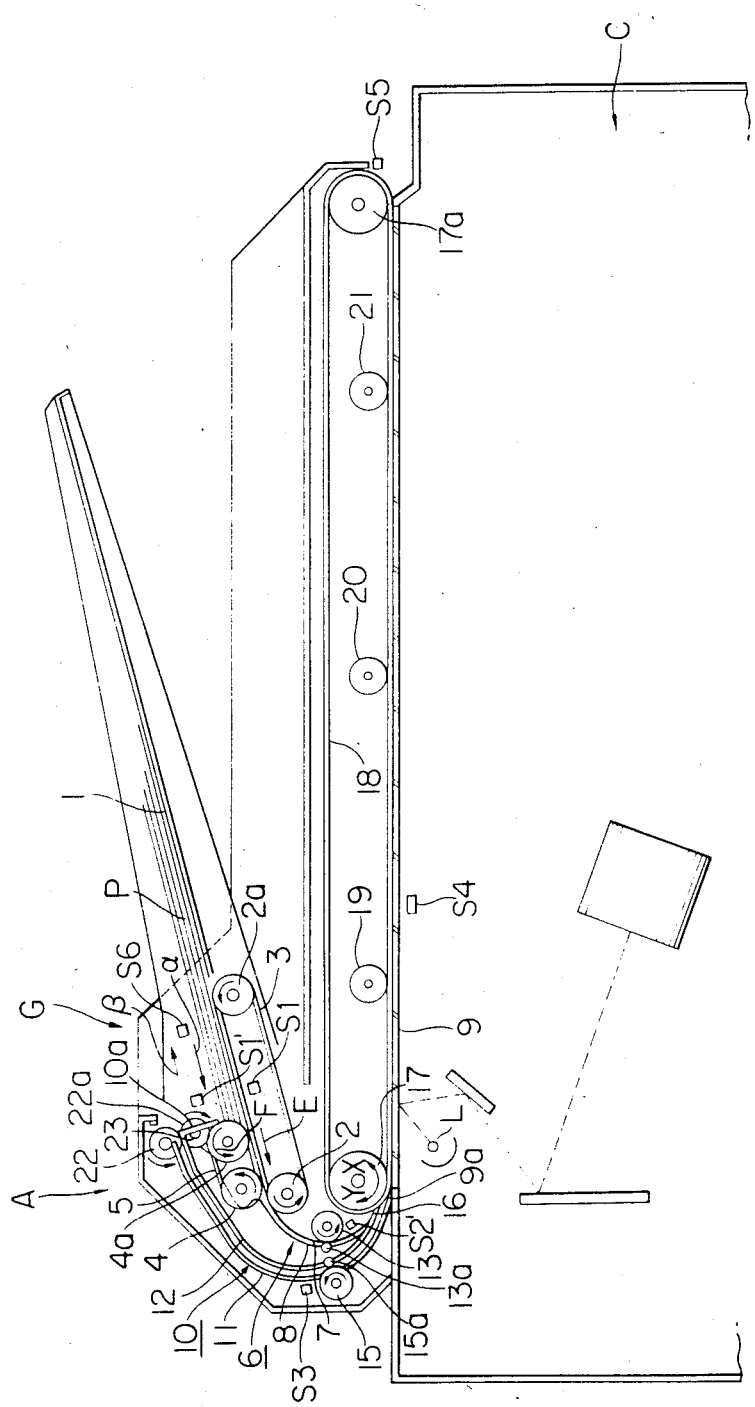
FIG. 2 is a cross-sectional view of the automatic sheet original feeder shown in FIG. 1.

FIG. 2 is a view showing the internal structure of a part of the automatic sheet original feeder A and the copier C shown in FIG. 1. In FIG. 2 there are shown a feeding tray 1, a feeding belt 3 and a separating belt 5 as shown in FIG. 1; sheet originals P stacked on the feeding tray 1 with the image faces upwards; feeding rollers 2, 2a for rotating the feeding belt 3 in the direction of arrow E to advance the sheet original; and separating rollers 4, 4a for rotating the separating belt 5 in the direction of arrow F for separating the lowermost one of the sheet originals in cooperation with the feeding belt 3. Said feeding belt 3 and the separating belt 5 constitute a separating-feeding unit G positioned in the vicinity of the lowermost one of the sheet originals stacked on the inclined tray 1.

A first sheet path 6 is formed between guide members 7, 8 for guiding the sheet original, separated between the feeding belt 3 and the separating belt 5, to a glass platen 9. Also a second sheet path 10 is defined between guide members 11, 12 for guiding the sheet original, after exposure with a lamp L, from the glass platen 9 to the feeding tray 1. Said second sheet path 10 is positioned opposed to the first sheet path 6 and extends itself from an end 9a of the glass platen 9 to a position above the separating belt 5, passing a position outside the sheet path 6 or distant from the belt 18. At an end 10a of said second sheet path 10 positioned above the separating belt 5 there are provided ejecting rollers 22, 22a, whereby the sheet original ejected from the platen 9 and guided through the sheet path 10 is ejected onto the tray 1 in a direction $\beta$, which is opposite to the initial feeding direction $\alpha$ of the stacked sheet originals by the feeding belt 3 and the separating belt 5. In this manner the sheet feeding direction from the tray 1 and the sheet returning direction to the tray 1 are mutually opposite.

Paired sheet transport rollers 13, 13a and 15, 15a are rotated as illustrated, the former being used for advancing the sheet original in the sheet path 6 toward the glass platen 9 while the latter is used for advancing the sheet original in the sheet path 10 toward the feeding tray 1. A deflector plate 16 is mounted on the guide member 12 in such a manner that the front end of said deflector plate 16 is maintained in contact with the guide member 7, whereby the sheet original passing through the sheet path 6 can advance by pushing said deflector plate aside by while the sheet original returning from the glass platen 9 can smoothly glide into the sheet path 10 as said deflector plate 16 is pushed against the guide member 7. Said deflector plate 16 is composed for example of a Mylar sheet.

Original transport rollers 17, 17a rotate an original transport belt 18 for moving the sheet original on the glass platen 9. Said roller 17 is rotated in a direction X when the sheet original is set to a determined position on the glass platen 9, and is rotated in an opposite direction Y when the sheet original is ejected from the glass platen 9 after the exposure step. Rollers 19, 20, 21 maintain the belt 18 in contact with the glass platen 9, thereby ensuring the transportation of the sheet original with said belt.

Ejecting rollers 22, 22a eject the sheet original from the sheet path 10 onto the feeding tray 1. An unrepresented clock plate is rotated in synchronization with the roller 17, and a photointerrupter detects the slits formed on said clock plate to generate clock pulses corresponding to the displacement of the belt 18.

There are provided original detecting sensors S1–S6. An original sensor, composed of a lamp S1' and a phototransistor S1, detects the presence of a sheet original on the feeding tray 1. A registering sensor S2, which is a reflective sensor composed of a light-emitting diode and a phototransistor, detects the presence of a sheet original in the sheet path 6.

A first feed-out sensor S3 detects the presence of a sheet original in the sheet path 10. The platen sensor S4 detects the presence of a sheet original on the glass platen 9. A second feed-out sensor S5 detects that a sheet original is ejected toward the right in the illustration from the glass platen 9. Said sensors S3, S4, S5 are all of a reflective type, the same as the registering sensor S2.

A partition sensor S6 detects the position of an unrepresented partition plate to be placed on a set of sheet originals and is composed of a Hall IC capable of detecting a magnet mounted on said partition plate.

The separating-feeding unit G has a liftable cover for facilitating, for example, removal of sheets jammed in the apparatus.

Figure 3:
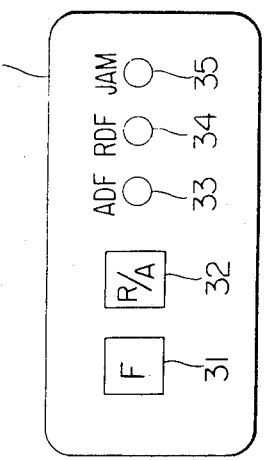
FIG. 3 is a plan view of a control panel provided in front of the automatic sheet original feeder.

FIG. 3 shows an operation panel 24 provided on the front face of the automatic sheet original feeder A. A mode switch 31 is for instructing original feeding by said feeder A. A selector switch 32 selects between an RDF (recycle document feed) mode in which a copying operation is effected for each feeding of a sheet original and the feeding is repeated a number of times corresponding to the desired number of copies, and an ADF (automatic document feed) mode in which copying operations of a number corresponding to the desired number of copies are conducted for each sheet original fed by the feeder and a succeeding sheet original is fed upon completion of said continuous copying operations whereby the number of feeding operations is equal to the number of stacked sheet originals.

Indicators 33, 34, 35 composed of light-emitting diodes are respectively lighted upon selection of the ADF mode, upon selection of the RDF mode and in the case of a sheet jamming in the automatic sheet original feeder A.

Figure 4:
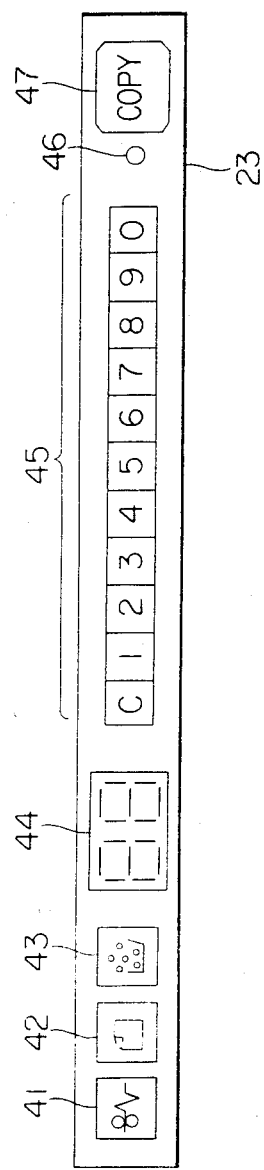
FIG. 4 is a plan view of a control panel provided on the main body of the copier.

FIG. 4 shows an operation panel 23 provided on the copier C, wherein provided are a jam lamp 41 indicating sheet jamming in the copier; a paper lamp 42 indicating the absence of copy sheets; a toner lamp 43 indicating the need for new developer; a numeral display unit 44 for indicating the number entered from numeral input keys 45; a stand-by lamp 46 indicating that the copier is ready; and a copying button 47 for instructing the start of copying operations. The above-described keys, lamps and display unit may also be provided on the automatic sheet original feeder.

Figure 5:
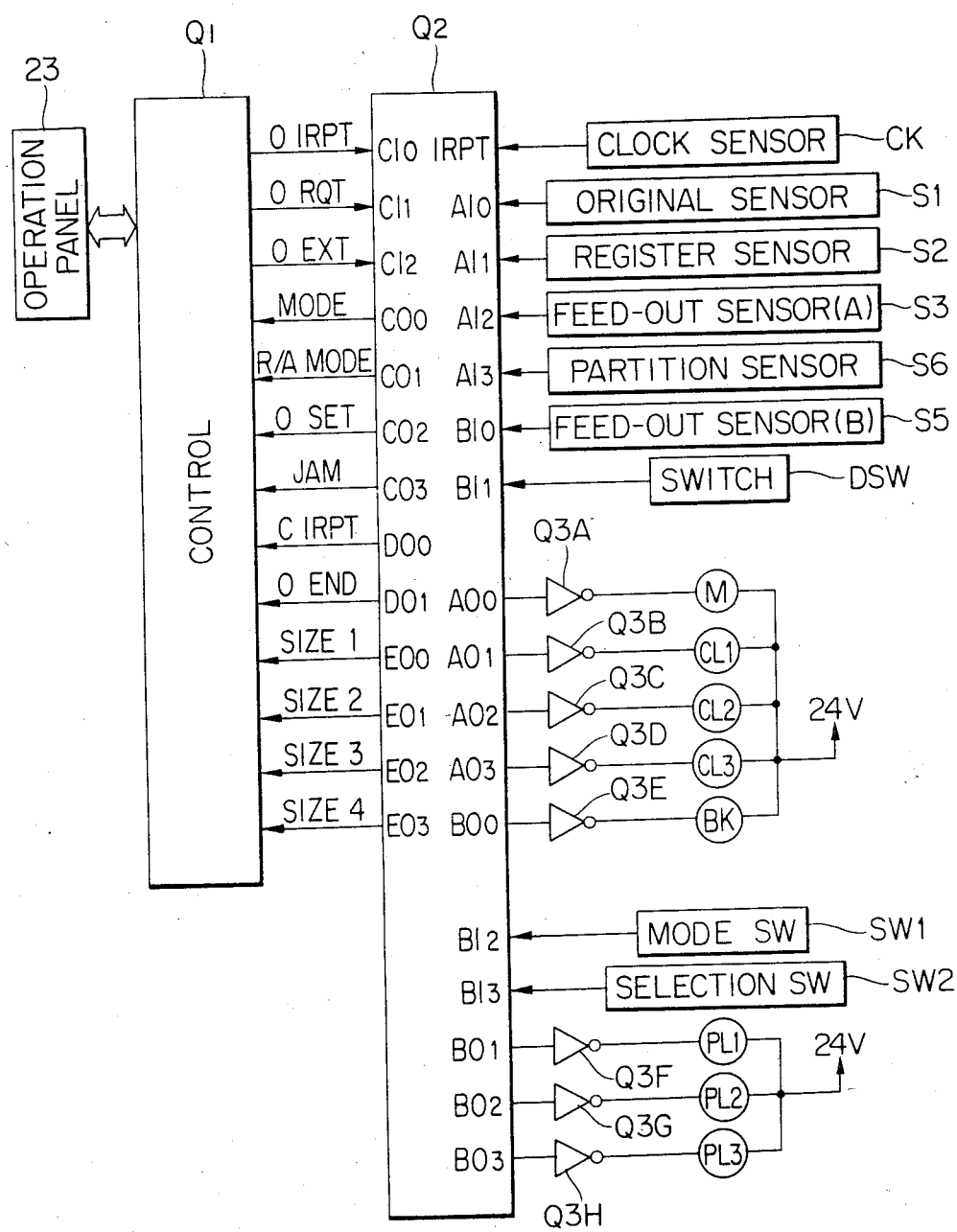
FIG. 5 is a block diagram of a control circuit for the automatic sheet original feeder.

FIG. 5 is a block diagram of a control circuit for the automatic sheet original feeder A shown in FIG. 2.

There are provided a control unit Q1 comprising a known microcomputer and principally controlling the function of the copier itself; a control unit Q2 comprising a microcomputer for controlling the automatic sheet original feeder and consisting of a known large-scale integrated circuit including various units such as ROM, RAM, ALU, I/O, latch, etc.; an interruption port IRPT for the microcomputer of the control unit Q2; input ports AI0, AI1, AI2, AI3, BI0, BI1, BI2, BI3, CI0, CI1 and CI2; and output ports AO0, AO1, AO2, AO3, BO0, BO1, BO2, BO3, CO0, CO1, CO2, CO3, DO0, DO1, EO0, EO1, EO2 and EO3.

The control unit Q2 supplies various output signals to the output ports in response to the input signals to said input ports, thereby controlling the functions of various units.

A clock pulse sensor CK is for example a photointerrupter composed of a light-emitting diode and a phototransistor and detects the slits formed on the aforementioned clock plate rotating in synchronization with the transport roller 17.

S1–S6 indicate the original sensors explained before. A switch DSW detects the open or closed state of the lid of the separating-feeding unit G.

There are also shown transistor arrays Q3A, Q3B, . . . , Q3H; a DC motor M for driving the rollers of the feeding device; an electric clutch CL1 for transmitting the rotation of said motor M for driving the rollers 2, 4 in the direction of arrow; an electric clutch CL2 for transmitting the rotation of said motor M to drive, when energized, the roller 17 in the direction X; and an electric clutch CL3 for similarly driving, when energized, said roller 17 in the oppsite direction Y. The roller 13 rotates in the direction of arrow when said clutch CL2 or CL3 is energized.

There are further shown an electric brake BK for stopping the roller 17 precisely; a mode switch SW1 to be actuated by the operator when the present feeder is used; a selector switch SW2 for selecting the aforementioned ADF or RDF mode; an indicator PL1 to be lighted in the ADF mode; an indicator PL2 to be lighted in the RDF mode; and an indicator PL3 to be lighted in case of jamming of a sheet original.

Input ports CI0, CI1 and CI2 receive the signals from the control unit Q1 of the copier, and the output ports CO0, CO1, CO2, CO3, DO0, DO1, EO0, EO1, EO2 and EO3 supply control signals to the control unit Q1.

Figure 6A:
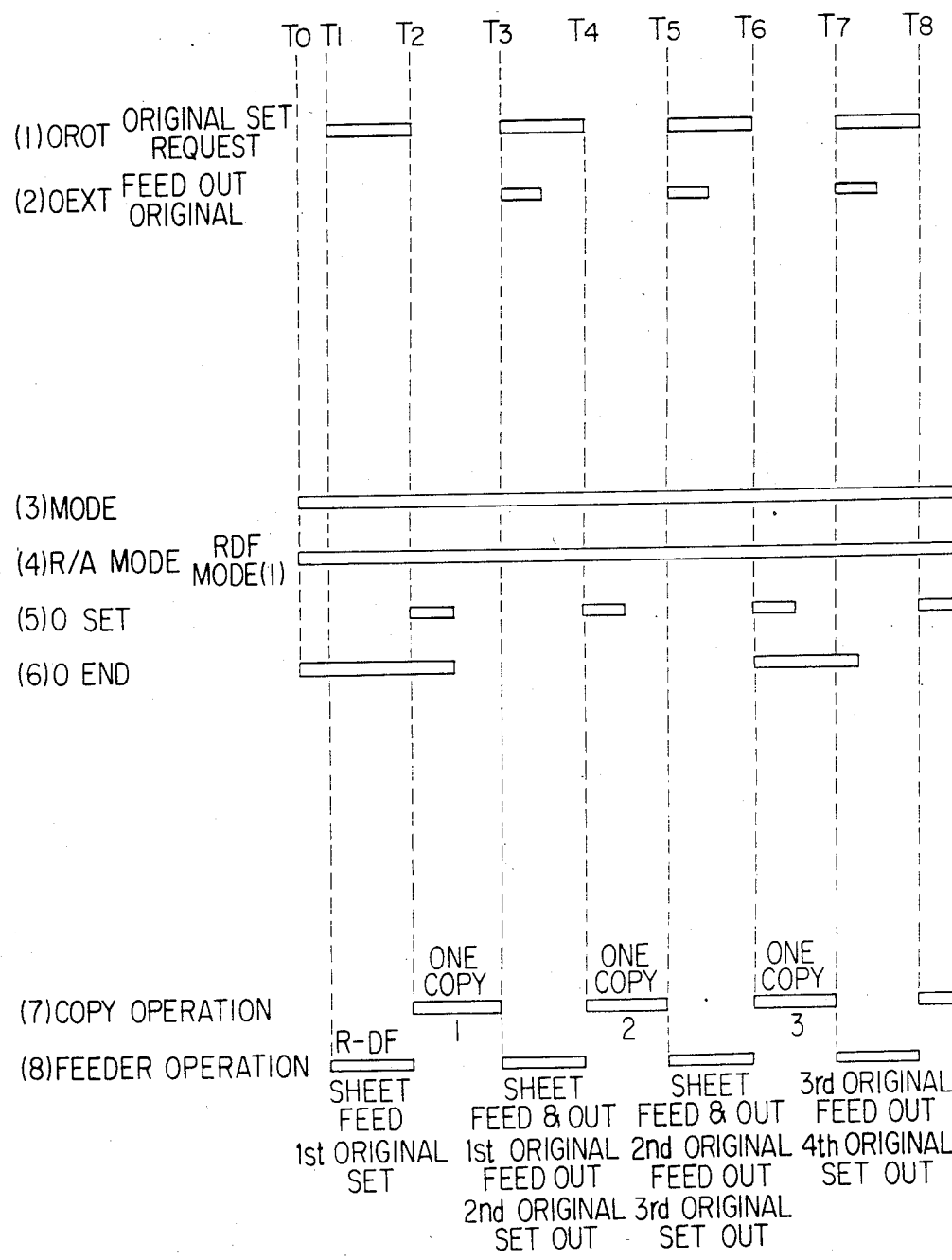
FIG. 6, composed of FIGS. 6A and 6B, is a timing chart showing the mode of signal transfer between the control units Q1 and Q2.

FIG. 6 is a timing chart showing the transfer of signal between the control unit Q1 of the copier and the control unit Q2 of the automatic sheet original feeder, in the case of producing three copies from each of three originals.

Upon start of power supply at a time T0, the copier enters the stand-by state after a pre-processing which lasts for a determined period.

Also at the start of power supply, the automatic sheet original feeder A supplies the copier with a MODE signal (3) through the output port CO0 and an R/A signal (4) indicating whether the RDF mode for conducting one copying operation for each feeding of the sheet original or the ADF mode for N copying operations for each feeding of the sheet original, from the output port CO1. Said signal indicates the RDF mode in the state "1" and the ADF mode in the state "0", and FIG. 6 shows a state in which the RDF mode is selected. Said MODE signal (3) is released when the automatic sheet original feeder is selected and the sheet originals are placed on the feeding tray 1. Thus FIG. 6 shows a state in which the sheet originals are already placed on the feeding tray 1.

Also the output port DO1 releases an OEND signal (6) indicating the partition of the sheet originals when they are placed and at every feeding of the third sheet original. Said signal indicates the boundary between the first and last originals and is obtained from the original sensor S6.

FIG. 7 is a flow chart showing the sequence control program for the copier C and the automatic sheet original feeder A.

Now there will be explained the procedure of the copying operation, while making reference to FIGS. 6 and 7.

After the start of power supply a step K1 effects the initial setting and the stand-by processing as explained before, and, upon actuation of the copying button 47 at a time T1, the program proceeds to a step K2 for identifying whether the automatic sheet feeder mode is selected, and, if affirmative, whether the ADF or RDF mode is selected, and for modifying the numerals entered from the numeral input keys and displayed on the display unit 44. The displayed numerals indicate a normal number of copies in the ADF mode, but in the RDF mode indicated is the number of repetition of feeding cycles since in this case only one copying operation is conducted for each feed of the sheet originals. More specifically, the displayed number is step increased at each copying operation in the ADF mode, but in the RDF mode the displayed number increased stepwise upon completion of a series of copying operations corresponding to the entire set of sheet originals.

Upon completion of the aforementioned preprocessing, a step K3 is executed whereby the control unit Q1 supplies the input port CI1 with an original request signal ORQT (1) for setting the first original. The automatic original feeder feeds the original in a period from T1 to T2, and, upon completion of said feeding, an original set signal OSET (5) is supplied from the output port CO2 to the copier.

A succeeding step K4 executes the copying operation in the already known manner, and, upon completion of the exposure of the sheet original by the optical system, the program proceeds to a step K5 or K6 respectively in the RDF mode or in the ADF mode.

In the RDF mode, a step K5 stepwise advances the count of a copy counter CNT in the presence of the OEND signal (6) indicating the completion of a set of copying operations. Then a step K7 identifies whether the determined number of copying operations has been completed, and, if the count of the counter CMT does not reach said determined number, a step K8 releases an ORQT signal (1) and an OEXT signal (2) to the automatic sheet feeder at a time T3. On the other hand, if said number is reached, the program proceeds to a step K9. In response to said signals ORQT (1) and OEXT (2), the automatic sheet feeder effects the ejection and feeding or sheet originals, and, upon setting of the succeeding original, releases the signal OSET (5) at a time T4, thereby initiating the copying operation for said second sheet original. The second copying operation is conducted similarly in a period from T4 to T5, and, since the copying of determined number is not yet completed in this state, the signals ORQT (1) and OEXT (2) are released at a time T5 in the same manner at T3. Then the ejection of the second original and the feeding of the third original are simultaneously conducted during a period from T5 to T6, and the OSET signal (5) is again released at a time T6. Thereafter the third copying operation is conducted, and the signals same as those released at T3 are again released at T7, thereby ejecting the third original and feeding the first original. At said time T7 the original partition signal OEND (6) is supplied to the copier, whereby the displayed number indicating the number of completed sets of copying operations changes from "0" to "1" as explained in relation to the step K5, thus representing the completion of a set of copyings. The above-described operations are repeated until the copy counter reaches the set number N. In the example shown in FIG. 6, the OEXT signal (2) is released at a time TN to eject the original, whereby the entire operation is completed. A step 9 releases said OEXT signal (2) to conduct the sheet ejection alone and sets an unrepresented flag, and the program returns to the step K1 after a post-processing procedure.

The ADF mode is conducted in a substantially same manner as shown in a period from T0 to T7 in FIG. 6, except that the copying operation is conducted not one time but N times during a period from T2 to T3 and the succeeding operation shown in a period from T3 to T4 is conducted thereafter. The same applies to the periods T4–T5 and T6–T7.

More specifically, a step K6 is executed to stepwise advance the counter for each copying operation and to identify whether the displayed number has reached the set copy number. The step K4 is repeated if said set copy number is not reached. When said set copy number is reached, the program proceeds to the step K10 for identifying the presence of the OEND signal (6), and, if absent, a step K8 is executed to release the OEXT signal (2) and the ORQT signal (1) for causing the automatic sheet feeder to effect the ejection and feeding of the sheet originals. Then, in response to the entry of the OSET signal (5), the copying operation for the succeeding original is initiated. On the other hand, in case of presence of the OEND signal (6), the program proceeds to the step K9 for terminating the copying operation in the same manner as in the aforementioned RDF mode.

Figure 8:
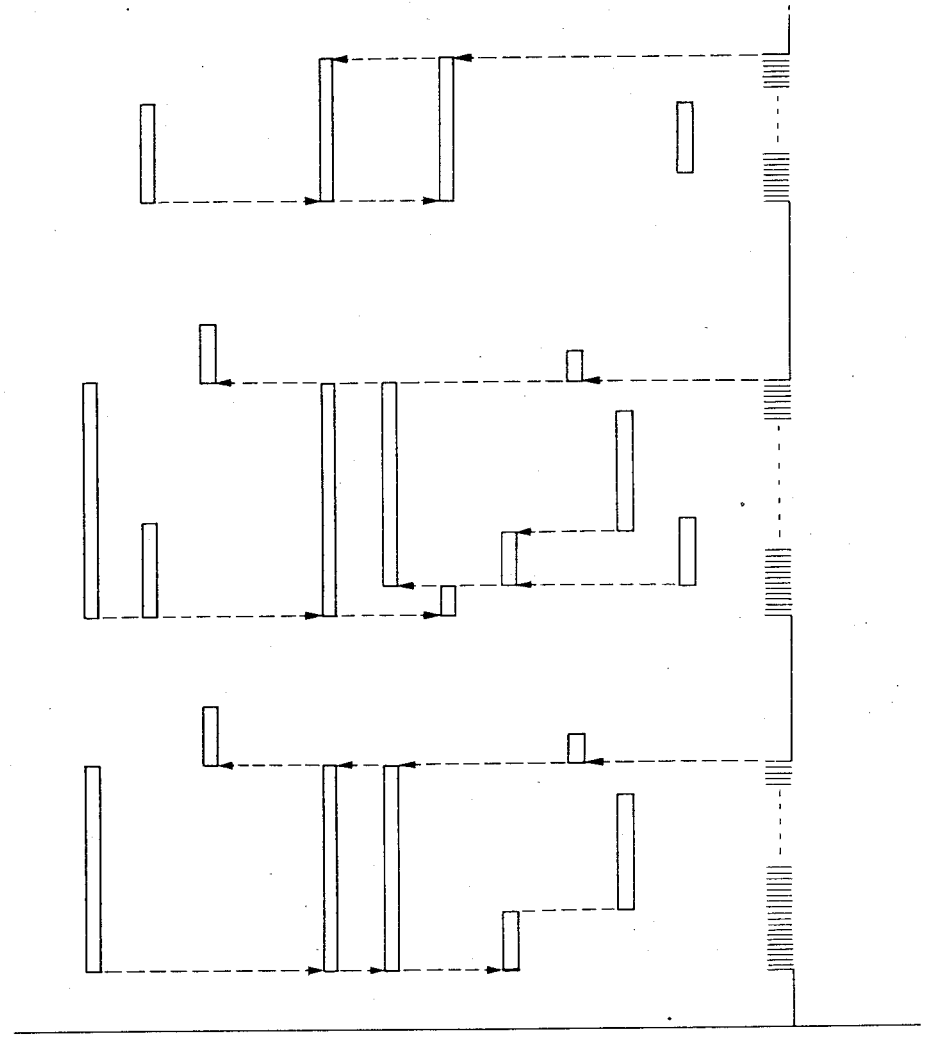
FIG. 8 is a timing chart showing the functions of the input/output loads of the automatic sheet original feeder.
Figure 9:
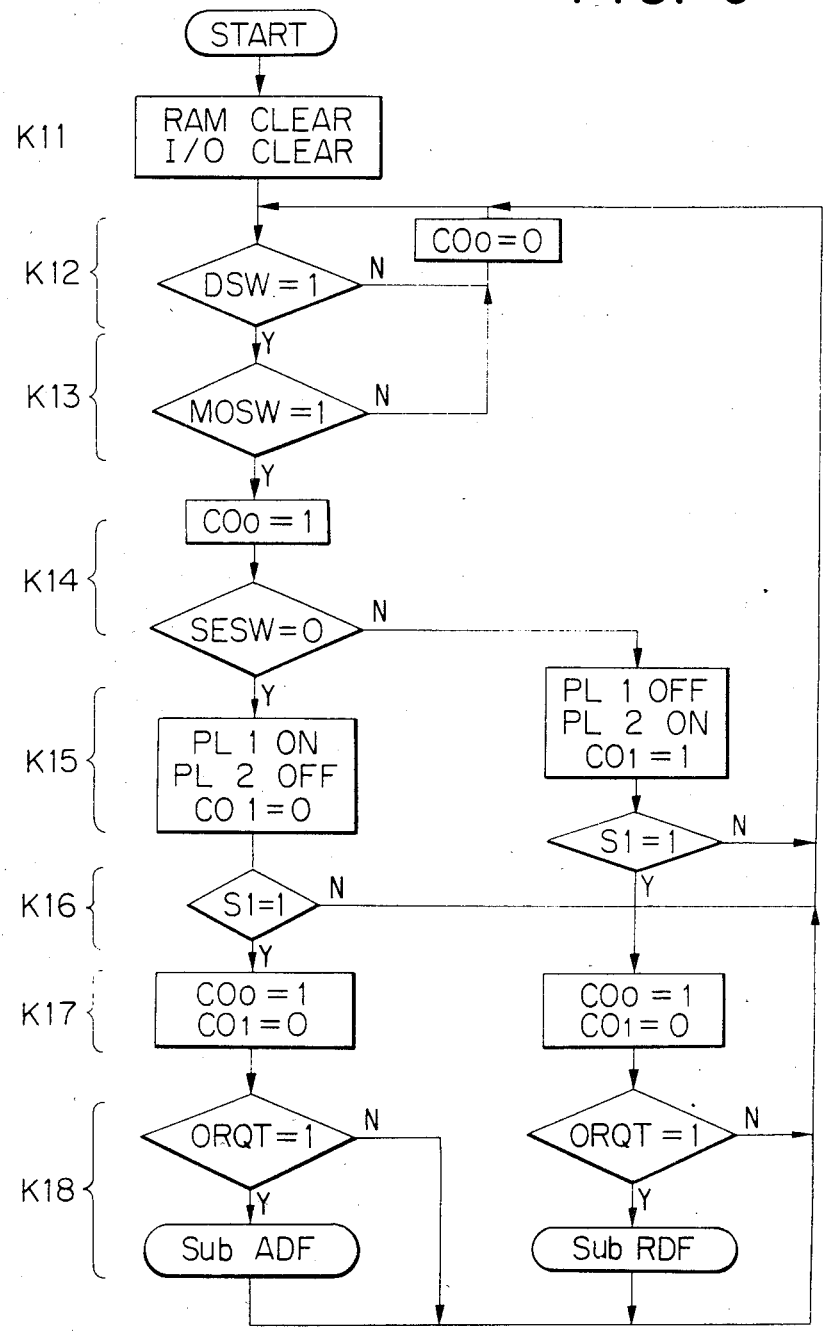
FIGS. 9, 10A and 10B are flow charts showing the sequence control programs of the control unit Q2.
Figure 10A:
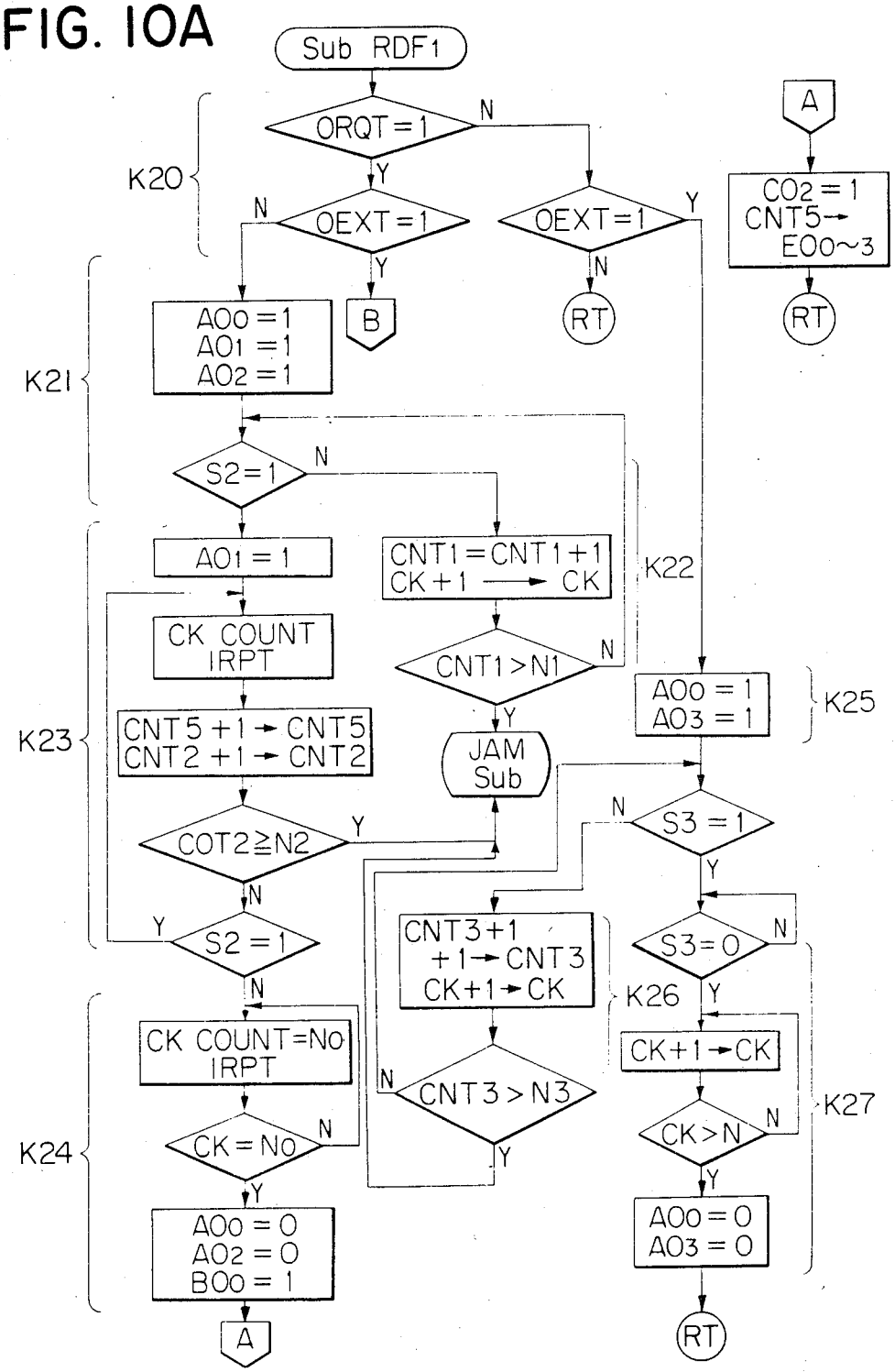
Figure 10B:
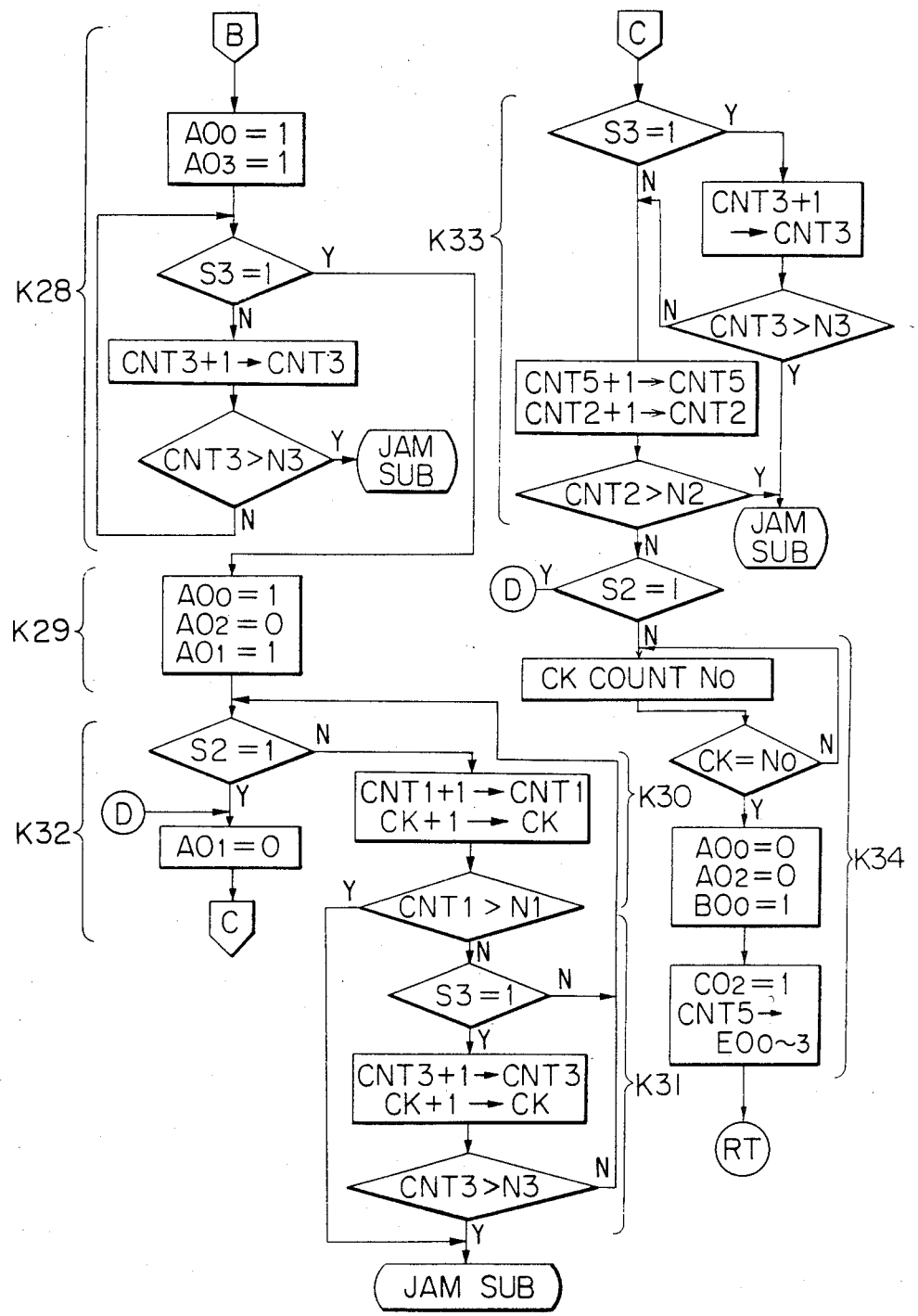

FIG. 8 is a timing chart showing the functions of input/output loads of the automatic sheet original feeder A, and FIGS. 9, 10A and 10B are flow charts showing a corresponding sequence control program.

With the start of power supply by an unrepresented power switch, all the circuits in the automatic sheet feeder are activated, and the program for the microcomputer is started. A step K11 resets the RAM and the I/O ports. A step K12 reads, through the input port BI1, a signal DSW indicating whether the cover of the separating-feeding unit G is closed, and, if it is closed, the program proceeds to a step K13. If it is open, the program remains in the step K12 until it becomes closed.

Then a step K13 identifies, through the state of the input port BI2, whether the mode switch 31 has been actuated, and, if affirmative, a step K14 identifies, by the state of the input port BI3, whether the selector key 32 has selected the RDF or ADF mode. Then a step K15 turns on, in case of the RDF mode, the indicator PL2 through the output port BO2 and the transistor array Q3H, thereby lighting the RDF mode indicator 34, or, in case of the ADF mode, the indicator PL1 through the output port BO1 and the transistor array Q3G, thereby lighting the ADF mode indicator 33.

A step K16 identifies the presence of a sheet original on the feeding tray 1 by the sensor S1, and the program returns to the step K12 in case the sheet original is absent. In case of presence thereof, the program proceeds to a step K17 to supply a MODE signal indicating the operation mode of the automatic sheet feeder from the output port CO0 to the control unit Q1 of the copier. Simultaneously an R/A mode signal, indicating the ADF or RDF mode respectively in "0" or "1" as explained before, is supplied from the output port CO1.

Then a step K18 identifies awaits the original request signal ORQT to be supplied from the control unit Q1 of the copier for setting the sheet original, and, upon reception thereof, executes a subroutine subADF for the ADF mode or a subroutine subRDF for the RDF mode. Thereafter the program returns to the step K12 and repeats the above-described procedure.

Now reference is made to FIGS. 10A and 10B showing the subroutine subRDF. At first a step K20 identifies the state of the signal ORQT to be supplied from the copier for requesting the feeding of a sheet original, and of the signal OEXT for requesting the ejection of a sheet original. In this manner the step K20 identifies whether the original feeding or the original ejection is required or both are required, and the program accordingly jumps to a step K21, K25 or K28.

In the case that the original feeding alone is required, a step K21 is executed to shift the output ports AO-0–AO2 to the "H" state to turn on the motor M, clutch CL1 and clutch CL2, whereby a sheet original is fed from the feeding tray 1 to the original sensor S2. A step K22 counts the clock pulses CK until the arrival of the sheet original at said sensor, thereby identifying the presence of sheet jamming. An area CNT1 of an unrepresented RAM is used for said counting. A count not exceeding a determined number N1 identifies the absence of sheet jamming. On the other hand, in the case that said count exceeds said number N1, sheet jamming is identified and the program proceeds to a jam subroutine subJAM for interrupting the function of the device, displaying the jam state, etc. The details of such jam processing will not be explained in detail.

In case the sheet original is fed in normal manner to the sensor S2, the program proceeds to a step K23, which, upon sheet detection by the sensor S2, turns off the clutch CL1 to stop the feeding belt 3 and the separating belt 5. In this state the sheet original continues to advance toward the glass platen 9 by means of the roller 13.

The RAM is further provided with a counter CNT2 for identifying a stay jamming, and another counter CNT5 for detecting the longitudinal length of the sheet original, both by counting the clock pulses CK in the similar manner as the jam detecting counter CNT1. When the count of said counter CNT2 exceeds a determined number N2, a stay jam state is identified and a jam processing is executed in the same manner as explained before.

There are generated 4 clock pulses CK for a displacement of 1 mm of the sheet original. Consequently a lateral displacement of a sheet original of A4 size ($210 \times 297$ mm) generates $210 \times 4 = 840$ clock pulses. Thus a sheet original of A4 size can be identified if the count of said counter CNT5 is approximately equal to 840. Other sizes can be identified similarly.

The sheet size can usually be identified from the longitudinal dimension thereof since the sheet original of A3 size is usually fed along the longer side thereof while that of A4 or A5 size is usually fed along the shorter side thereof. Such identification becomes not possible in case the sheet of A4 size is fed along the shorter side thereof while that of A5 size is fed along the shorter side thereof while that of A5 size is fed along the longer side thereof, but size distinction in such case can still be made by detecting the transversal dimension of the sheet original.

When the sheet original passes through the sensor S2, the program proceeds to a step K24, which, upon counting of N0 clock pulses after the passing of the trailing end of the sheet original through the sensor S2, turns off the motor M and the clutch CL2 and turns on the brake BK to stop the sheet original at a determined position. Upon completion of the feeding of the sheet original to the determined position in this manner, the original set signal OSET is supplied from the output port CO2 to the copier. Simultaneously original size signals indicating the original size identified in the step K23 are supplied from the output port EO0-EO3 to the copier, which thus can select the appropriate copy sheet and the original scanning distance in response to said signals, or effect a copying operation with a modified image magnification according to the original size and the size of the copy sheet.

Now there will be explained a case in which the original ejection alone is conducted. In such case the program proceeds from the step K20 to the step K25 to shift the output ports AO0, AO3 to "H" level, thereby turning on the motor M and the clutch CL3, thus driving the conveyor belt 18 in a direction of arrow D to eject the sheet original. In this case a step K26 checks the presence of sheet jamming by means of a counter CNT3, and, upon counting of N clock pulses after the passing of the sheet original through the sensor S3, a step K27 turns off the motor and the clutch CL3. Said N clock pulses correspond to a period required for the sheet original to go through the sheet path 10 after passing the sensor S3.

Now there will be explained a case in which the original ejection and the original feeding are both conducted. In such case the program proceeds to a step K28 to shift the output ports AO0, AO3 to "H" level thereby turning on the motor M and turning on the clutch CL3 to reverse the belt 18. The sheet original on the glass platen 9 is moved to the left by the belt 18 and reaches the roller 15, which is rotated with a peripheral speed twice as large as that of the belt 18. Consequently the sheet original is ejected at this point with a larger speed. The program proceeds to a step K29 when the leading end of the sheet original passes the sensor S3.

The step K29 maintains the motor M in energized state but turns off the reversing clutch CL3 and turns on the forward clutch CL2 to drive the belt 18 in the normal direction indicated by an arrow C, thereby advancing a succeeding sheet original from the feeding tray 1. Also the clutch CL1 is energized to drive the feeding belt 3 and the separating belt 5.

The program repeats steps K30 and K31 until the sheet original reaches the sensor S2, wherein said step K31 detects the jamming of the ejected sheet original, and the step K30 detects the jamming of the newly fed sheet original. Upon arrival of the sheet original at the registering sensor S2, a step K32 is executed to stop the feeding belt 3 and the separating belt 5, and a step K33 detects the size of the sheet original in the same manner as explained before. When the sheet original becomes no longer detected by the sensor S2, the program proceeds to a step K34.

In this manner the ejection and feeding of sheet originals are simultaneously conducted, and, if the ejected sheet original is long, said sheet originals temporarily overlap each other between the belt 18 and the glass platen 9, while moving in the mutually opposite directions. Such overlapping however causes no practical problem since the ejected sheet original is securely driven by the paired rollers 15, 15a. Also the setting of a new sheet original to the determined exposure position can be easily achieved since the preceding sheet original is no longer present on the glass platen 9 when the new sheet original passes through the registering sensor S2. In this manner it is rendered possible to promptly set a new sheet original and to reduce the time required for copying operations.

The step K34 will not be explained in detail since it is identical with the step K24 in a procedure in which the original feeding alone is conducted.

Also the subroutine subADF in the ADF mode will not be explained in detail since it is already known and is not an essential part of the present invention.

Figure 11:
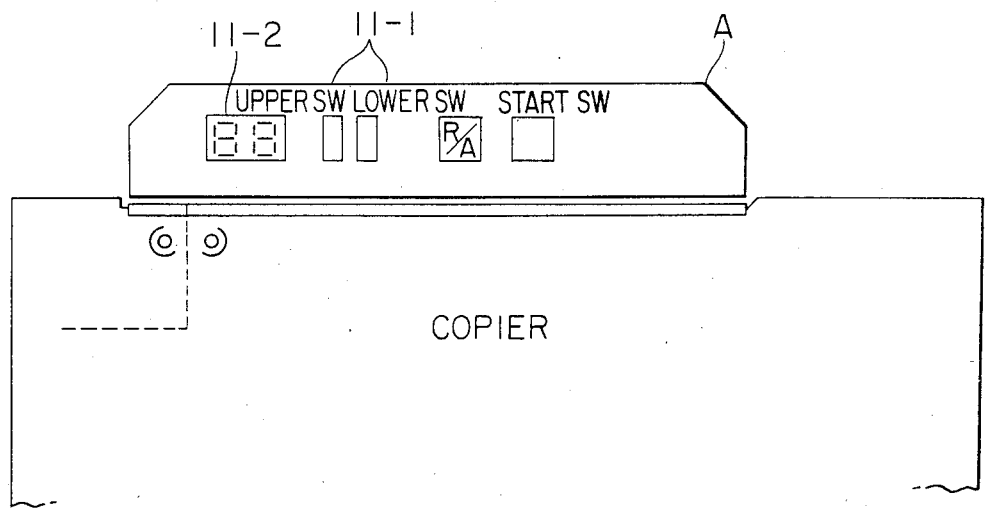
FIG. 11 is an external view of another embodiment of the present invention.

The sequence control of the copier itself is principally achieved by the steps K1 and K4 shown in FIG. 7. However the above-described concept of using the numeral display unit of the copier differently in the RDF mode and in the ADF mode, which is a feature of the present embodiment, can not necessarily be applicable to any copier. For example the aforementioned program for switching the display may not be incorporated in the ROM of the microcomputer for a compact lowcost copier. Also the number of lines between the copier and the automatic sheet feeder may be limited. In such case, the automatic sheet feeder A may be provided, as shown in FIG. 11, with an additional switch 11-1 for setting the number of sets of copies and an additional display unit 11-2 therefor.

Figure 12:
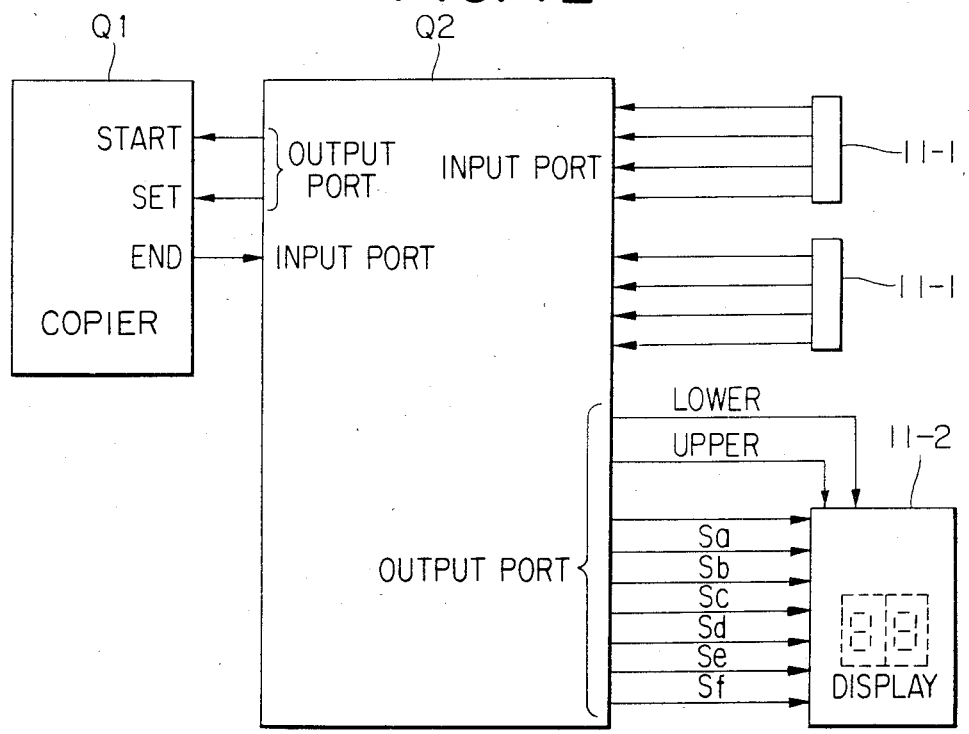
FIG. 12 is a block diagram of the circuit for the device shown in FIG. 11.

Such structure allows to reduce the number of signals to be exchanged between the copier and the automatic sheet feeder, and the control procedure similar to that shown in FIG. 7 can be effected within the automatic sheet feeder. FIG. 12 shows an example of the control circuit for use in such structure.

Furthermore it is possible to utilize the numeral display unit of the automatic sheet original feeder for plural purposes.

As explained in the foregoing, the present invention based on the above-described structure allows compactization of the feeder device through simplification of the mechanism and centralization of the driving units. The present invention thus provides a recycling automatic sheet original feeder which can be made compact by uniting the sheet stacking table with the sheet ejecting table through the change of rotating direction of a belt.

It is also rendered possible to reduce the sheet handling time since the feeding of a sheet original can be initiated while a preceding sheet original is ejected.

Also a sheet handling with improved efficiency is possible since the ejecting speed of sheet original is larger than the feeding speed thereof.

Furthermore a sheet handling device not requiring manual control since it is capable of identifying the size of the sheet original in feeding operation and of handling said sheet original according to the size thereof.

Furthermore the sheet handling device of the present invention is extremely convenient for the operator as the display of information is changed according to the selected operation mode.

Said device is also costwise advantageous since a display unit can be utilized for multiple purposes.

Now there will be explained an embodiment of the partition plate for use in the automatic sheet original feeder adapted for the copying operation with the aforementioned RDF mode.

As explained before, it is necessary, in the copying operation with the RDF mode, to clearly identify the partition between a final sheet original and a first sheet original. Said partition is also important since the counting operation is conducted at the end of a set of copying operations.

Figure 13:
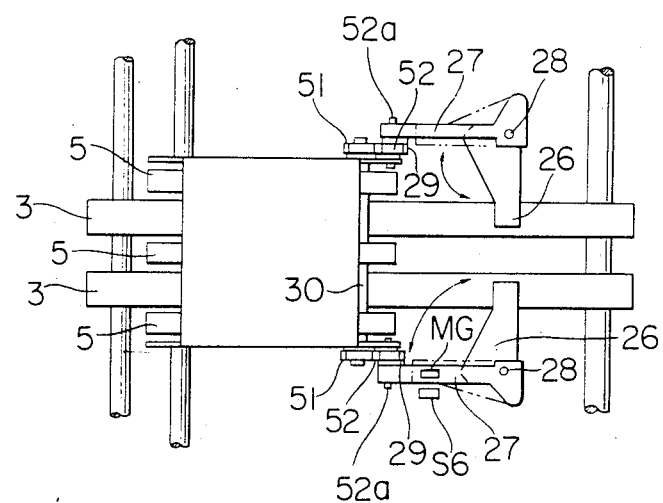
FIG. 13 is a detailed plan view showing the structure of an original separating unit.

FIG. 13 is a plan view of the original separating unit shown in FIG. 2, wherein provided are partition plates 26 for separating the sheet originals awaiting exposure from the sheet originals returning after exposure, said partition plates 26 being omitted in FIG. 2. Said partition plates 26 are respectively positioned on both sides of the separating-feeding unit G, and are supported by partition arms 27 with fulcrums at 28. Friction plates 29 are positioned between the partition arms 27 and arm gears 52 engaging with gears 51 fixed separating roller shafts 30 for transmitting the rotation of the separating rollers 4, 4a, when unrepresented clutches are deactivated, thereby biasing said partition arms 27 mounted on shafts 52a toward the feeding tray. Said shafts 52a are provided with unrepresented springs for biasing the arms 27 upwards, whereby, when said clutches are energized, the partition plates 26 rotate about the shafts 52a upwards and become positioned at a determined distance from the feeding tray 1.

In addition to the function of defining a boundary in the sheet originals, said partition plates 26 assisting the original feeding in the separating-feeding unit G, since the free ends of said partition plates are maintained in contact with the belts 5 to press the sheet originals P toward the belts 3 thereby ensuring the separation of the lowermost sheet original.

The partition plates 26 articulated to the partition arms 27 at the fulcrums 28 can be set, by means of unrepresented solenoids, either at the solid-line position or at the chain-line position as indicated by arrows R.

There are also shown the partition sensor S6 explained before, and a magnet MG mounted on the partition arm 27.

Figure 14:
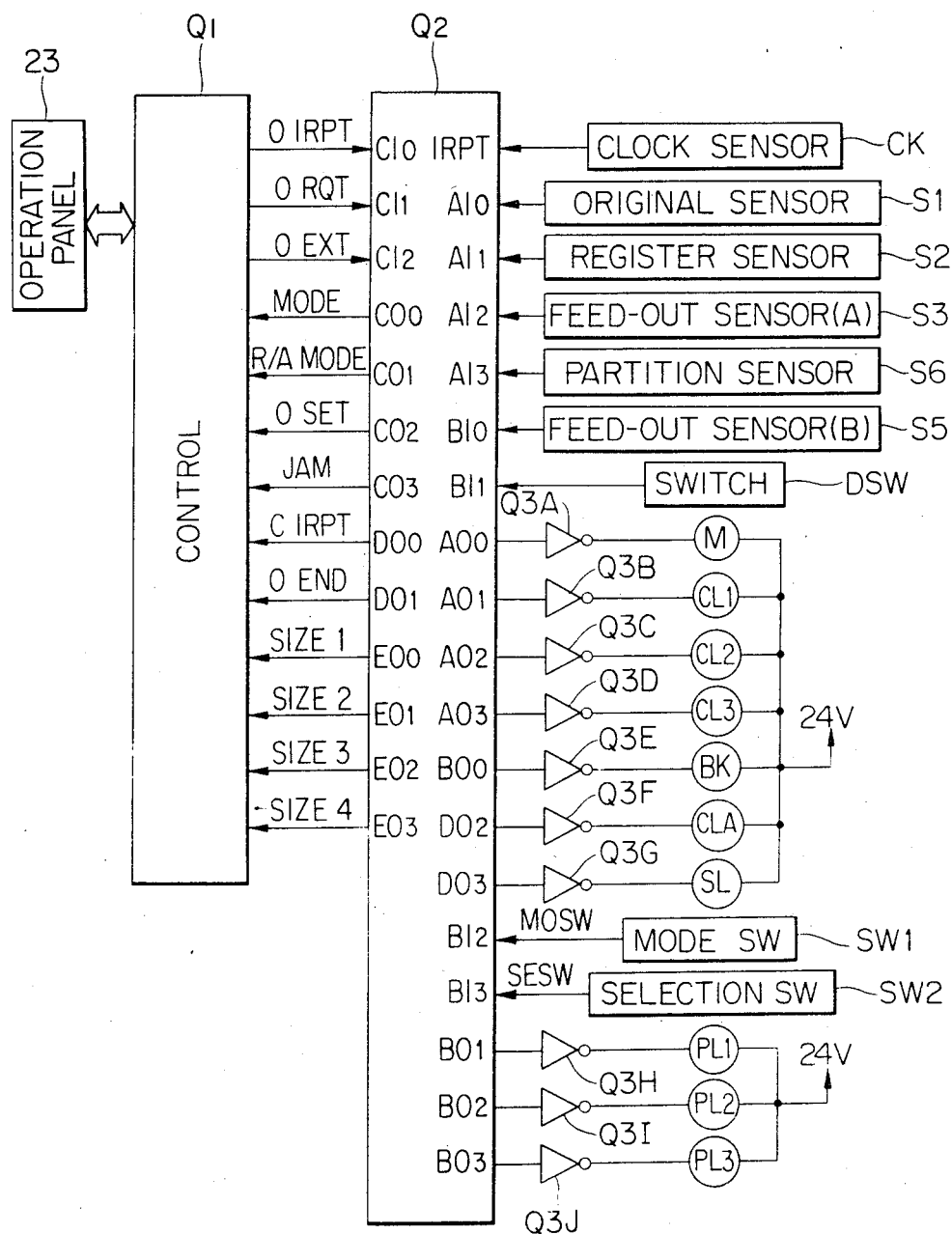
FIG. 14 is a block diagram showing another embodiment of the control circuit for the automatic sheet original feeder.

FIG. 14 is a block diagram of the circuit for controlling the automatic sheet original feeder A of FIG. 2 additionally provided with the partition plates 26 shown in FIG. 13, wherein same blocks, signals and input/output ports as those in FIG. 5 are represented by same symbols.

There are provided a control unit Q1 comprising a known microcomputer and principally controlling the function of the copier itself; a control unit Q2 comprising a microcomputer for controlling the automatic sheet original feeder and consisting of a known large-scale integrated circuit including various units such as ROM, RAM, ALU, I/O latch, etc.; an interruption port IRPT for the microcomputer of the control unit Q2; input ports AI0, AI1, AI2, AI3, BI0, BI1, BI2, BI3, CI0, CI1 and CI2; and output ports AO0, AO1, AO2, AO3, BO0, BO1, BO2, BO3, CO0, CO1, CO2, CO3, DO0, DO1, EO0, EO1, EO2 and EO3.

The control unit Q2 supplies various output signals to the output ports in response to the input signals to said input ports, thereby controlling the functions of various units.

A clock pulse sensor CK is for example a photointerrupter composed of a light-emitting diode and a phototransistor and detects the slits formed on the aforementioned clock plate rotating in synchronization with the transport roller 17.

S1–S6 indicate the original sensor explained before. A switch SDW detects the open or closed state of the lid of the separating-feeding unit G.

There are also shown transistor arrays Q3A, Q3B, ..., Q3J; a DC motor M for driving the rollers of the feeding device; an electric clutch CL1 for transmitting the rotation of said motor M for driving the rollers 2, 4 in the direction of arrow; an electric clutch CL2 for transmitting the rotation of said motor M to drive, when energized, the roller 17 in the direction X; and an electric clutch CL3 for similarly driving, when energized, said roller 17 in the opposite direction Y. The roller 13 rotates in the direction of arrow when said clutch CL2 or CL3 is energized.

There are further shown an electric brake BK for stopping the roller 17 precisely; a partition clutch CL4 for transmitting, when not energized, the rotation of the separating roller 4 to the partition arms 27; a solenoid SL for moving, when energized, the partition plates 26 to the chain-line position shown in FIG. 13; a mode switch SW1 (31) to be actuated by the operator when the present feeder is selected; a selector switch SW2 (32) for selecting the aforementioned ADF or RDF mode; an indicator PL1 to be lighted in the ADF mode; an indicator PL2 to be lighted in the RDF mode; and an indicator PL3 to be lighted in case of jamming of a sheet original.

Input ports CI0, CI1 and CI2 receive the signals from the control unit Q1 of the copier, and the output ports CO0, CO1, CO2, CO3, DO0, DO1, EO0, EO1, EO2 and EO3 supply control signals to the control unit Q1.

The transfer of signals between the copier and the automatic sheet original feeder, or between the control units Q1 and Q2, and the function of the copier itself will not be explained in detail, since they are essentially same as explained in relation to the timing chart in FIG. 6 and the flow chart in FIG. 7. In the following there will therefore be given an explanation on the control of input-output loads of the automatic sheet original feeder A.

Figure 15:
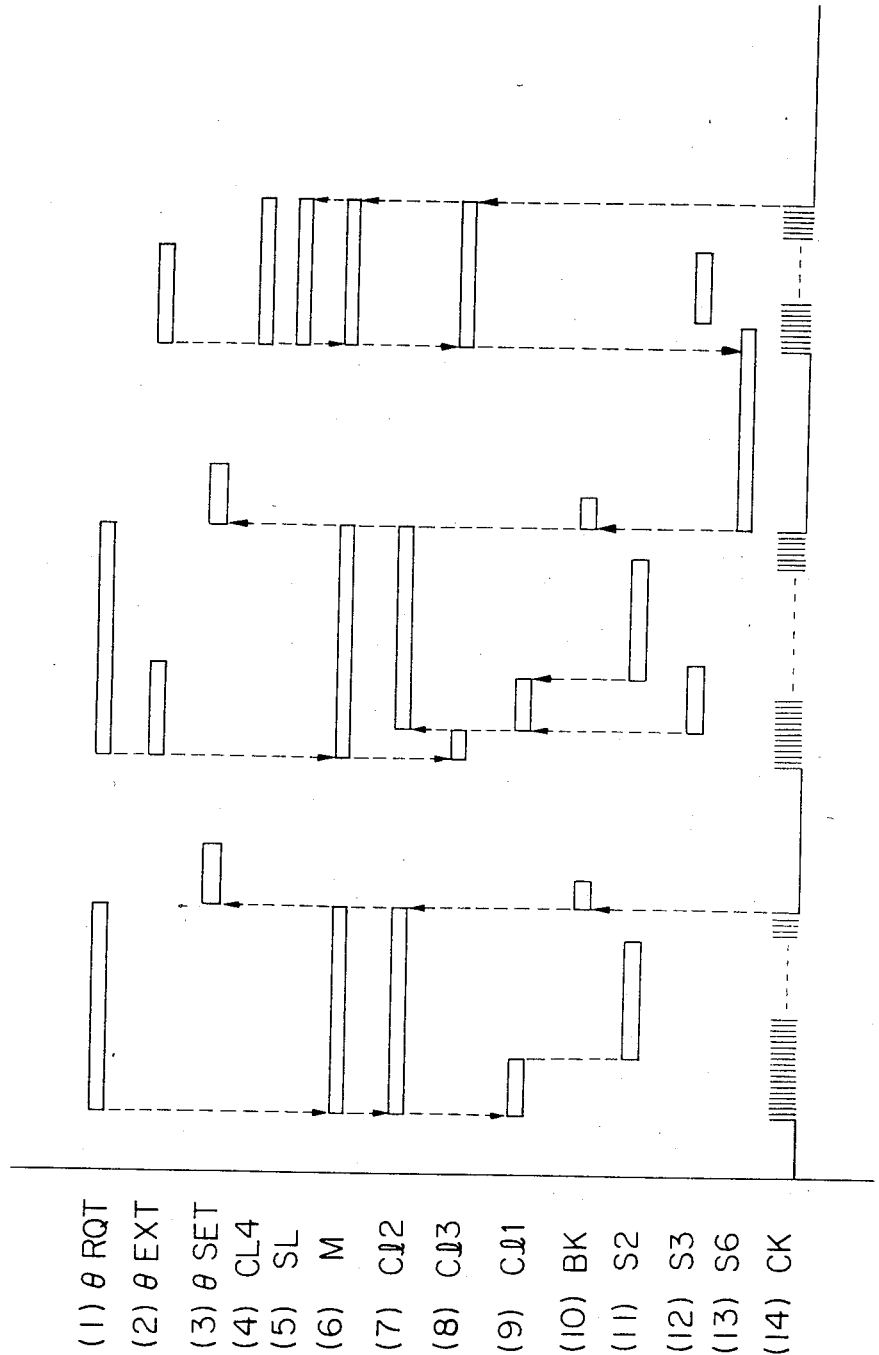
FIG. 15 is a timing chart showing the functions of input/output loads of the automatic sheet original feeder.
Figure 16A:
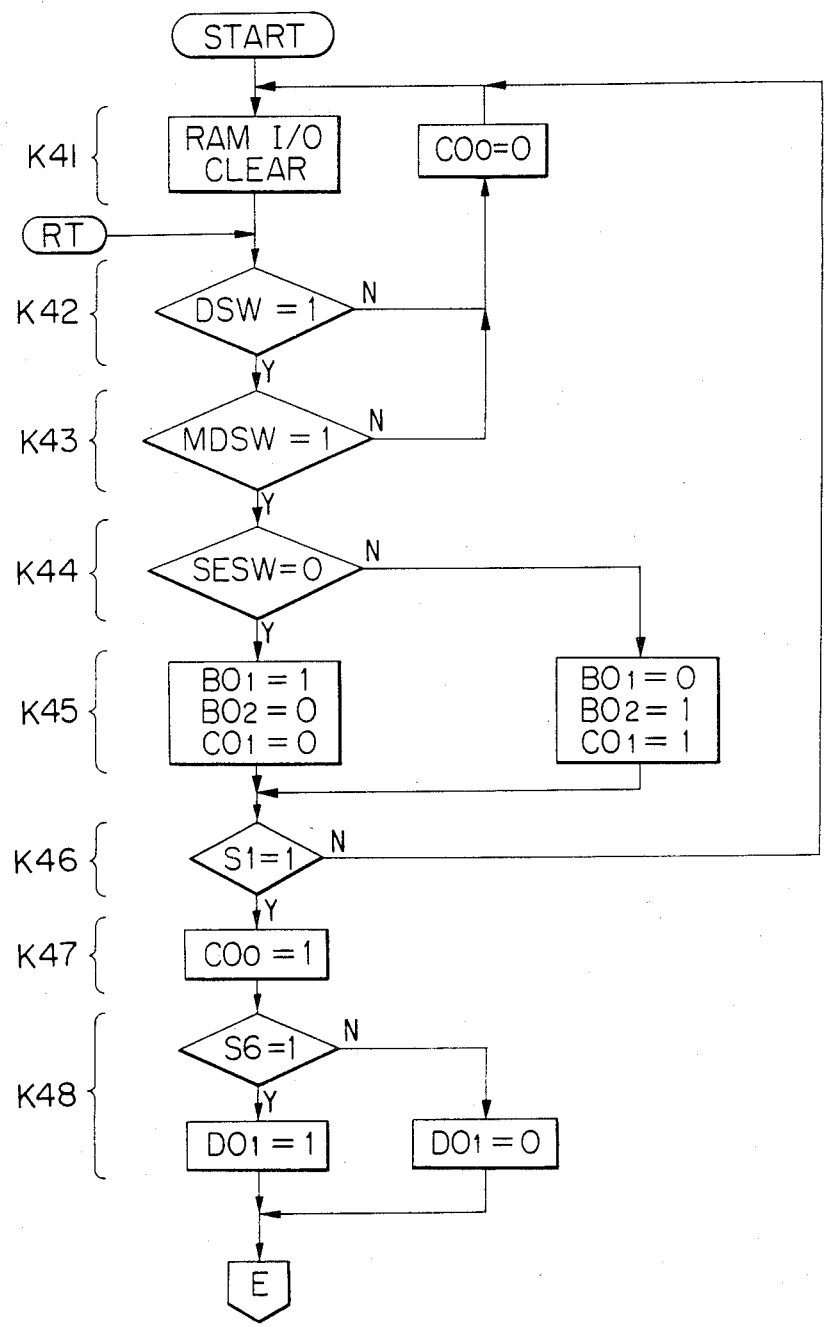
FIGS. 16A, 16B and 16C are flow charts showing the sequence control program for a control unit Q2 shown in FIG. 14.
Figure 16B:
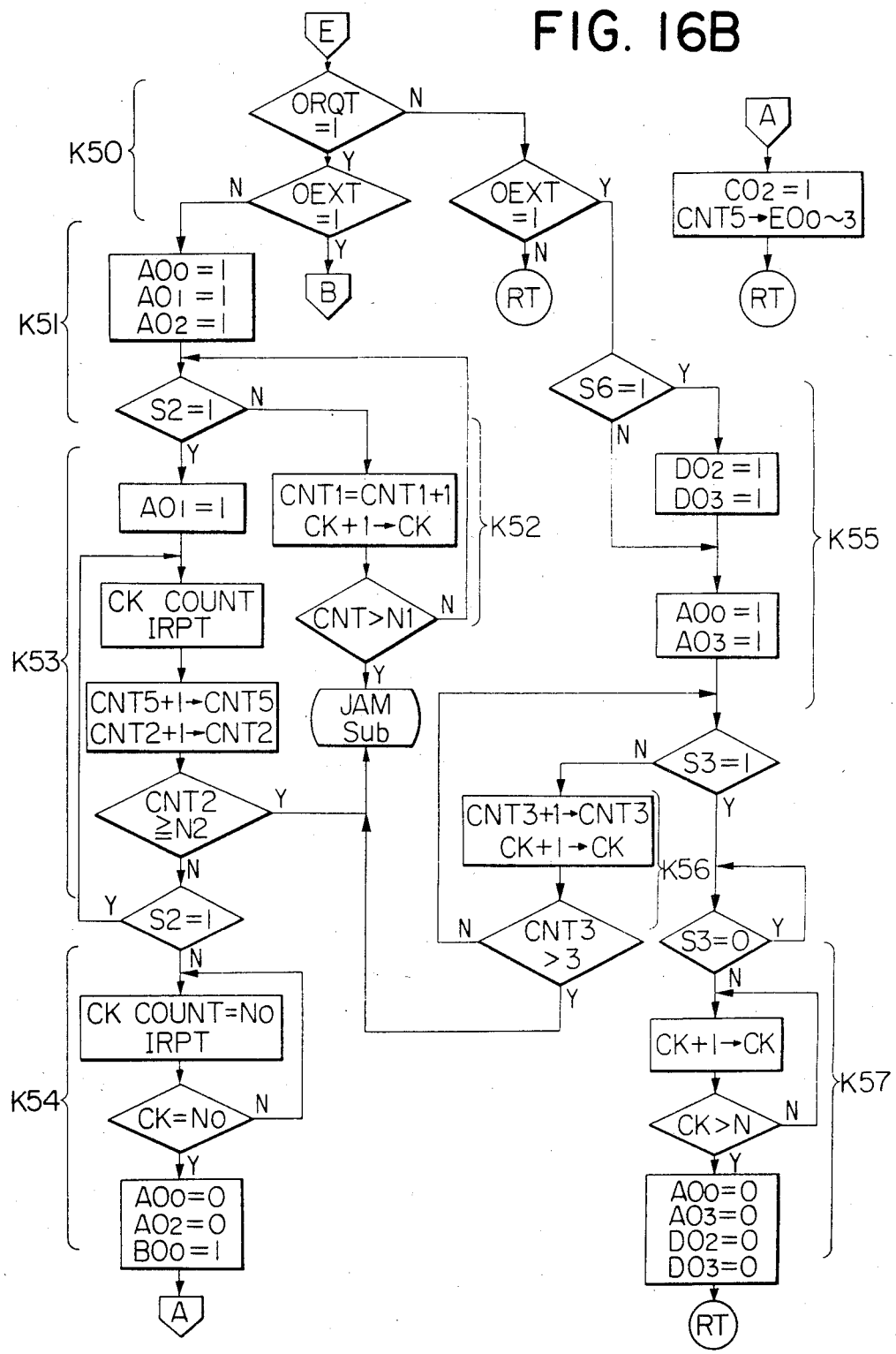
Figure 16C:
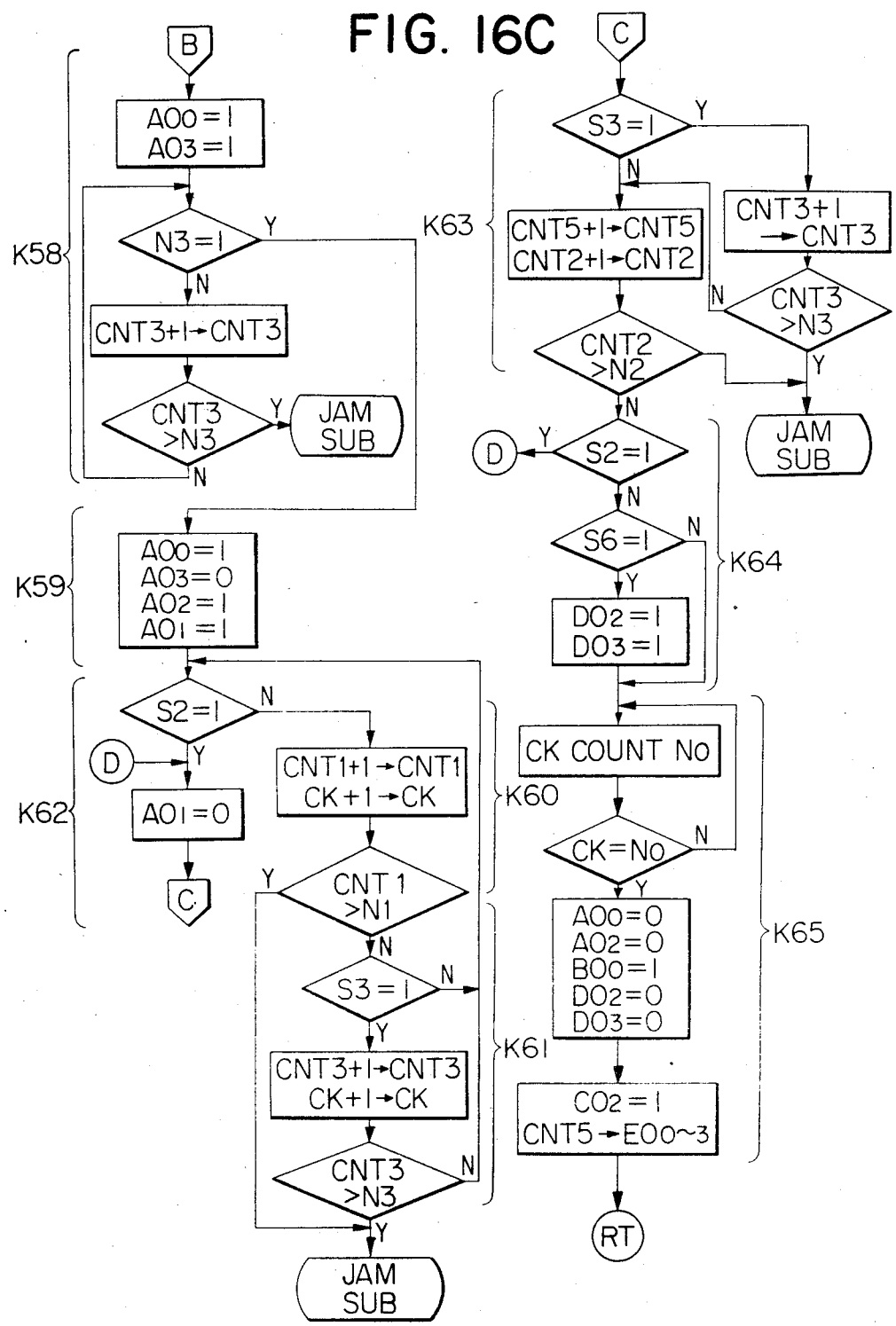

FIG. 15 is a timing chart showing the functions of input/output loads of the automatic sheet original feeder A, and FIGS. 16A, 16B and 16C are flow charts showing a corresponding sequence control program.

With the start of power supply by an unrepresented power switch, all the circuits in the automatic sheet feeder are activated, and the program for the microcomputer is started. A step K41 resets the RAM and I/O ports. A step K42 reads, through the input port BI1, a signal DSW indicating whether the cover of the separating-feeding unit G is closed, and, if it is closed, the program proceeds to a step K43. If it is open, the program remains in the step K42 until it becomes closed.

Then a step K43 identifies, through the state of the input port BI2, whether the mode switch 31 has been actuated, and, if affirmative, a step K44 identifies, by the state of the input port BI3, whether the selector key 32 has selected the RDF or ADF mode. Then a step K45 turns on, in case of the RDF mode, the indicator PL2 through the output port BO2 and the transistor array Q3I, thereby lighting the RDF mode indicator 34, or, in case of the ADF mode, the indicator PL1 through the output port BO1 and the transistor array Q3H, thereby lighting the ADF mode indicator 33.

Simultaneously an R/A mode signal, indicating the ADF or RDF mode respectively in "0" or "1" as explained before, is supplied from the output port CO1.

Then a step K46 identifies the presence of a sheet original on the feeding tray 1 by the sensor S1 and the program returns to the step K41 in case the sheet original is absent. In case of presence thereof, the program proceeds to a step K47 to supply a MODE signal indicating the operation mode of the automatic sheet feeder from the output port CO0 to the control unit Q1 of the copier.

A step K48 identifies the presence, at the input port AI3, of a signal indicating the partition of the sheet originals from the sensor S6, and, if present, releases the OEND signal from the output port DO1.

Then a step K50 identifies the state of the signal ORQT to be supplied from the copier for requesting the feeding of a sheet original, and of the signal OEXT for requesting the ejection of a sheet original. In this manner the step K50 identifies whether the original feeding or the original ejection alone is requested or both feeding and ejection are requested, and the program accordingly jumps to a step K51, K55 or K58.

In case the original feeding alone is required, a step K51 is executed to shift the output ports AO0–AO2 to the "H" state to turn on the motor M, clutch CL1 and clutch CL2, whereby a sheet original is fed from the feeding tray 1 to the original sensor S2. A step K52 counts the clock pulses CK until the arrival of the sheet original at said sensor, thereby identifying the presence of sheet jamming. An area CNT1 of an unrepresented RAM is used for said counting. A count not exceeding a determined number N1 identifies the absence of sheet jamming. On the other hand, in case said count exceeds said number N1, sheet jamming is identified and the program proceeds to a jam subroutine subJAM. The details of such jam processing will not be explained in detail.

In case the sheet original is fed in normal manner to the sensor S2, the program proceeds to a step K53, which, upon sheet detection by the sensor S2, turns off the clutch CL1 to stop the feeding belt 3 and the separating belt 5. In this state the sheet original continues to advance toward the glass platen 9 by means of the roller 13.

The RAM is further provided with a counter CNT2 for identifying a stay jamming, and another counter CNT5 for detecting the longitudinal length of the sheet original, both by counting the clock pulses CK in the similar manner as the jam detecting counter CNT1. When the count of said counter CNT2 exceeds a determined number N2, a stay jam state is identified and a jam processing is executed in the same manner as explained before.

There are generated 4 clock pulses CK for a displacement of 1 mm of the sheet original. Consequently a lateral displacement of a sheet original of A4 size (210×297 mm) generates 210×4 = 840 clock pulses. Thus a sheet original of A4 size can be identified if the count of said counter CNT5 is approximately equal to 840. Other sizes can be identified similarly.

The sheet size can usually be identified from the longitudinal dimension thereof since the sheet original of A3 size is usually fed along the longer side thereof while that of A4 or A5 size is usually fed along the shorter side thereof. Such identification becomes not possible in case the sheet of A4 size is fed along the shorter side thereof while that of A5 size is fed along the longer side thereof, but size distinction in such case can still be made by detecting the transversal dimension of the sheet original.

When the sheet original passed through the sensor S2, the program proceeds to a step K54, which, upon counting of N0 clock pulses after the passing of the trailing end of the sheet original through the sensor S2, turns off the motor M and the clutch CL2 and turns on the brake BK to stop the sheet original at a determined position. Upon completion of the feeding of the sheet original to the determined position in this manner, the original set signal OSET is supplied from the output port CO2 to the copier. Simultaneously original size signals indicating the original size identified in the step K53 are supplied from the output port EO0–EO3 to the copier, which thus can select the appropriate copy sheet and the original scanning distance in response to said signals, or effect a copying operation with a modified image magnification according to the original size and the size of the copy sheet.

Now there will be explained a case in which the original ejection alone is conducted. In such case the program proceeds from the step K50 to the step K55.

The step K55 identifies the presence of an output signal from the sensor S6 indicating the partition of the sheet originals, and, if present, shifts the output ports DO2, DO3 to the "H" state to energize the partition clutch CL4 and the partition solenoid SL, whereby the partition plates 26 are moved onto the sheet originals present on the feeding tray 1. Also the step K55 shifts the output ports AO0, AO3 to the "H" level, thereby turning on the motor M and the clutch CL3, thus driving the conveyor belt 18 in a direction of arrow D to eject the sheet original. In this case a step K56 checks the presence of sheet jamming by means of a counter CNT3, and, upon counting of N clock pulses after the passing of the sheet original through the sensor S3, a step K57 turns off the motor and the clutch CL3. Said N clock pulses correspond to a period required for the sheet original to go through the sheet path 10 after passing the sensor S3.

Now there will be explained a case in which the original ejection and the original feeding are both conducted. In such case the program proceeds to a step K58 to shift the output ports AO0, AO3 to "H" level thereby turning on the motor M and turning on the clutch CL3 to reverse the belt 18. The sheet original on the glass platen 9 is moved to the left by the belt 18 and reaches the roller 15, which is rotated with a peripheral speed twice as large as that of the belt 18. Consequently the sheet original is ejected at this point with a larger speed. The program proceeds to a step K59 when the leading end of the sheet original passes the sensor S3.

The step K59 maintains the motor M in the energized state but turns off the reversing clutch CL3 and turns on the forward clutch CL2 to drive the belt 18 in the normal direction indicated by an arrow C, thereby advancing a succeeding sheet original from the feeding tray 1. Also the clutch CL1 is energized to drive the feeding belt 3 and the separating belt 5.

The program repeats steps K60 and K61 until the sheet original reaches the sensor S2, wherein said step K61 detects the jamming of the ejected sheet original, and the step K60 detects the jamming of the newly fed sheet original. Upon arrival of the sheet original at the registering sensor S2, a step K62 is executed to stop the feeding belt 3 and the separating belt 5, and a step K63 detects the size of the sheet original in the same manner as explained before. When the sheet original becomes no longer detected by the sensor S2, the program proceeds to a step K64.

In this manner the ejection and feeding of sheet originals are simultaneously conducted, and, if the ejected sheet original is long, said sheet originals temporarily overlap each other between the belt 18 and the glass platen 9, while moving the mutually opposite directions. Such overlapping however causes no practical problem since the ejected sheet original is securely driven by the paired rollers 15, 15a. Also the setting of a new sheet original to the determined exposure position can be easily achieved since the preceding sheet original is no longer present on the glass platen 9 when the new sheet original passes through the registering sensor S2.

A step K64 identifies, at the passing of the sheet original through the sensor S2, the presence of the output signal from the sensor S6 indicating the partition of the sheet originals, and, if present, shifts the output ports DO2, DO3 to "H" level to activate the partition clutch CL4 and the partition solenoid SL, thereby moving the partition plates 26 onto the sheet originals present on the feeding tray 1. A succeeding step K65 will not be explained since it is identical with the step K54 in case the original feeding alone is conducted.

As explained in the foregoing, the present invention provides an automatic sheet feeder capable of sheet-by-sheet feeding to a determined position from stacked plural sheet originals, which enables to easily recognize the partition of the stacked sheet originals and to control the function of the feeder according to said partition. It is therefore rendered possible, in case of producing plural copies from each of plural sheet originals, to repeat the feeding thereof by a desired number of times without confusion in the counting of times.

What I claim is:

1. An automatic original conveying device for conveying an original to a reading position and thereafter retracting the original from the reading position, comprising:
    means for supporting originals;
    feeding means for separating and feeding a lowermost one of the originals supported on said supporting means at a first speed;
    first guide means for leading the original fed by the feeding means to the reading position in a reversed state to that of the originals located on the supporting means;
    retracting means for retracting the original led to the reading position, at a second speed faster than the first speed, from the same side as that at which the original has been led to the reading position; and
    second guide means for returning the original to the supporting means from the same side as that from which the original has been fed, in a reversed state to that of said original retracted from the reading position.

2. An automatic original conveying device according to claim 1, wherein said second guide means is adapted to superpose the original which is to be returned, on the originals supported on said supporting means.

3. An automatic original conveying device according to claim 1, wherein said retracting means is adapted to displace the original in a direction opposite to the direction in which the original is displaced by said feeding means.

4. An automatic original conveying device according to claim 1, wherein said feeding means is adapted to feed a subsequent original while said retracting means is retracting the original led to the reading position.

5. An automatic original conveying device according to claim 1, wherein said feeding means is adapted to feed again the original returned to said supporting means by said second guide means.

6. An automatic original conveying device according to claim 1, wherein said supporting means includes a supporting tray adapted for stacking the originals thereon, said supporting tray being inclined toward the original feed side.

7. An automatic original conveying device according to claim 1, wherein said first guide means has an arch-shaped path adapted to lead the original.

8. An automatic original conveying device according to claim 1, wherein said second guide means has an arch-shaped path adapted to lead the original.

9. An original reading device for reading an original set to a reading position, comprising:
    means for supporting originals;
    feeding means for separating and feeding a lowermost one of the originals supported on said supporting means at a first speed;
    first guide means for leading the original fed by the feeding means to the reading position in a reversed state to that of the originals located on the supporting means;
    exposure means for exposing the originals led to the reading position by said first guide means;
    retracting means for retracting the exposed original led to the reading position, at a second speed faster than the first speed, from the same side as that at which the original has been led to the reading position; and
    second guide means for returning the original to the supporting means from the same side as that from which the original has been fed, in a reversed state to that of said original retracted from the reading position.

10. An original reading device according to claim 9, wherein said second guide means is adapted to superpose the original, which is to be returned, on the originals supported on said supporting means.

11. An original reading device according to claim 9, wherein said retracting means is adapted to displace the original in a direction opposite to the direction in which the original is displaced by said feeding means.

12. An original reading device according to claim 9, wherein said feeding means is adapted to feed a subsequent original, while said retracting means is retracting the original led to the reading position.

13. An original reading device according to claim 9, wherein said feeding means is adapted to feed again the original returned to said supporting means by said second guide means.

14. An original reading device according to claim 9, wherein said supporting means includes a supporting tray adapted to stack the originals thereon, said supporting tray being inclined toward the original feed side.

15. An original reading device according to claim 9, wherein said first guide means has an arch-shaped path adapted to lead the original.

16. An original reading device according to claim 9, wherein said second guide means has an arch-shaped path adapted to lead the original.

17. An original reading device according to claim 9, further comprising a platen glass, and wherein said reading position is located on said platen glass.

* * * * *

UNITED STATES PATENT AND TRADEMARK OFFICE
CERTIFICATE OF CORRECTION

PATENT NO. : 4,579,327

DATED : April 1, 1986

INVENTOR(S) : KATSUSHI FURUICHI

It is certified that error appears in the above-identified patent and that said Letters Patent is hereby corrected as shown below:

Column 1, line 11, after "position" insert --,--.

Column 3, line 52, change "by" to --,--.

Column 5, line 40, change "signal" to --signals--.

Signed and Sealed this

Fifteenth Day of July 1986

[SEAL]

Attest:

Attesting Officer

DONALD J. QUIGG

Commissioner of Patents and Trademarks